(12) United States Patent
Brockway

(10) Patent No.: US 10,030,810 B2
(45) Date of Patent: Jul. 24, 2018

(54) PIN BRACKET AND VALVE ASSEMBLY EMPLOYING THE SAME

(71) Applicant: FORD GLOBAL TECHNOLOGIES, LLC, Dearborn, MI (US)

(72) Inventor: Michael Alan Brockway, Pinckney, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 321 days.

(21) Appl. No.: 14/855,409

(22) Filed: Sep. 16, 2015

(65) Prior Publication Data

US 2017/0074416 A1    Mar. 16, 2017

(51) Int. Cl.
    *F16M 13/02*    (2006.01)
    *F16K 31/16*    (2006.01)
    *F15B 1/00*     (2006.01)

(52) U.S. Cl.
    CPC ............... *F16M 13/02* (2013.01); *F15B 1/00* (2013.01); *F16K 31/16* (2013.01)

(58) Field of Classification Search
    CPC ............ F16M 13/02; F15B 1/00; F16K 31/16
    USPC ....................... 251/282, 231, 279; 192/219.5; 74/473.11; 180/370
    See application file for complete search history.

(56) References Cited

U.S. PATENT DOCUMENTS

| | | | | |
|---|---|---|---|---|
| 237,769 | A * | 2/1881 | Old ........................ | F16K 35/025 251/109 |
| 745,827 | A * | 12/1903 | Hack ........................ | F16K 3/26 251/231 |
| 1,495,064 | A * | 5/1924 | Barnett .................... | F16K 31/44 137/346 |
| 1,996,675 | A * | 4/1935 | Hagan ....................... | F01L 7/10 74/54 |
| 5,427,411 | A * | 6/1995 | Iwasaki ................... | B62D 1/192 280/777 |
| 6,927,507 | B2 | 8/2005 | Hashimoto et al. | |
| 7,348,698 | B2 | 3/2008 | Ohta et al. | |
| 7,559,338 | B2 * | 7/2009 | Scobie ...................... | E03B 9/06 137/527 |
| 7,987,959 | B2 * | 8/2011 | Itazu ................... | F16H 63/3458 192/139 |
| 8,282,529 | B2 | 10/2012 | Funakoshi et al. | |
| 2012/0161046 | A1 * | 6/2012 | Tsai ..................... | F16K 31/0668 251/129.01 |
| 2013/0338890 | A1 | 12/2013 | Nagashima | |
| 2014/0190784 | A1 * | 7/2014 | Yokota ............... | F16H 63/3416 192/219.5 |

* cited by examiner

*Primary Examiner* — Ian Paquette
(74) *Attorney, Agent, or Firm* — Brooks Kushman P.C.

(57) ABSTRACT

The present invention in one or more embodiments provides a valve assembly which includes a valve shaft, and a valve head extending from the valve shaft, wherein the valve head defines first and second through-apertures extending along a width direction and a slot extending along a height direction, a longitudinal cross-section of the first and second through-apertures being partially received within the slot.

14 Claims, 4 Drawing Sheets

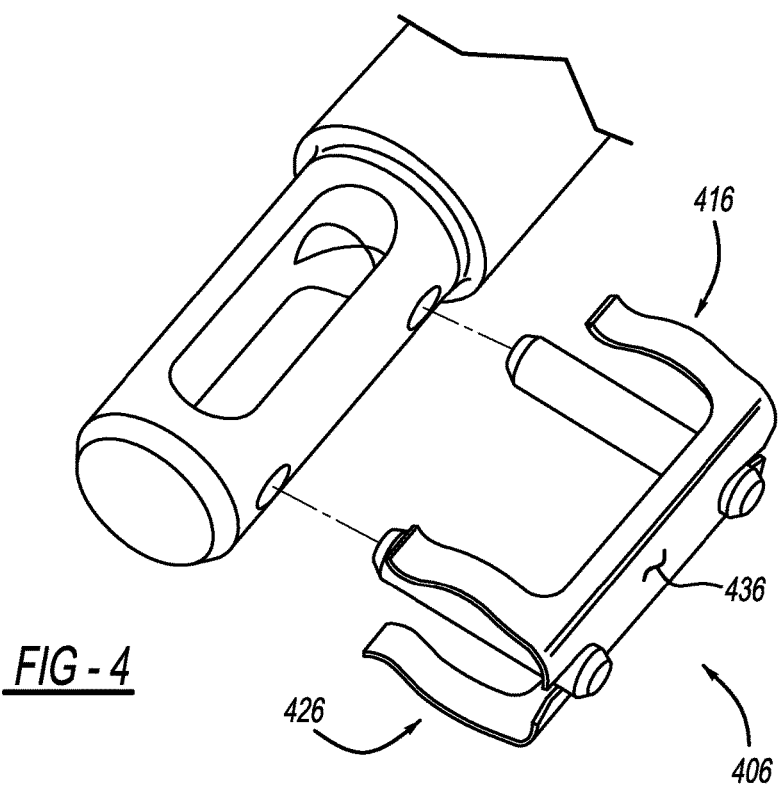
FIG - 4
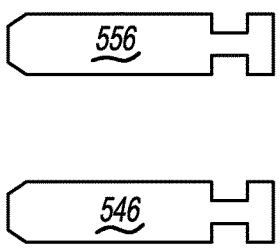
FIG - 5B
FIG - 5C
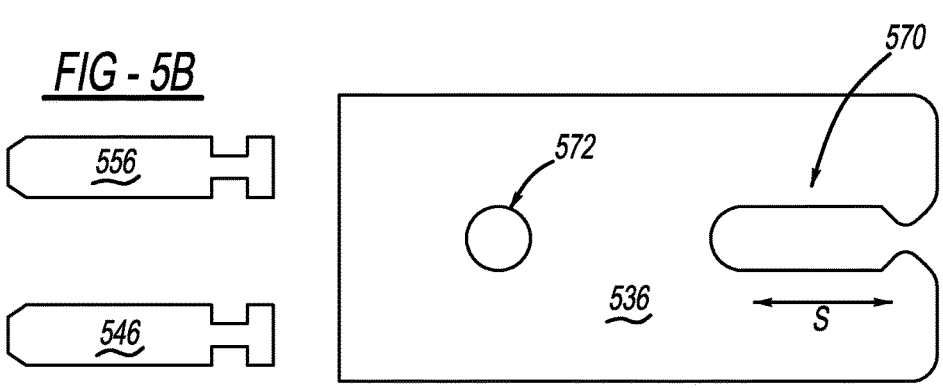
FIG - 5A

PIN BRACKET AND VALVE ASSEMBLY EMPLOYING THE SAME

TECHNICAL FIELD

The present invention relates to a pin bracket and a valve assembly employing the same.

BACKGROUND

Valve and lever designs are often employed to provide fluid flow control in certain operating systems. For instance, publication US 2013/0338890A1 discloses a control device for automatic transmission, where a manual valve is mechanically coupled to a select lever, and where the manual valve may form an oil path to discharge the oil in the forward/reverse direction depending upon travel or non-travel range.

SUMMARY

In one or more embodiments, a valve assembly includes a valve shaft, and a valve head extending from the valve shaft, wherein the valve head defines first and second through-apertures extending along a width direction and a bore extending along a height direction, a longitudinal cross-section of the first and second through-apertures being partially received within the bore.

The bore may be of an open-loop or a closed-loop in cross-section.

A longitudinal length of the bore may be greater than a cross-sectional width of at least one of the first and second through-apertures.

The valve assembly may further include a pin bracket to be attached to the valve head, the pin bracket including a bracket body with first and second cover panels and a waist panel positioned there-between, and first and second pins connected to the waist panel, wherein the first and second pins are to be received through the first and second through-apertures of the valve head at an assembly position.

At least one of the first and second pins may include a groove to engage the waist panel. The at least one of the first and second pins may be rotatable about the groove relative to the waist panel.

The first and second cover panels may respectively include first and second cover apertures to align with the bore of the valve head so as to collectively receive there-through a lever.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein:

FIG. 4 illustratively depicts an alternative perspective view of a pin bracket of the valve assembly referenced in FIG. 1, FIG. 2A, FIG. 2B and FIG. 3;

FIG. 5A illustratively depicts an alternative frontal view of a waist of the pin bracket referenced FIG. 3 and FIG. 4;

FIG. 5B illustratively depicts a side view of a pin to be assembled to the waist referenced in FIG. 5A; and FIG. 5C illustratively depicts a side view of another pin to be assembled to the waist referenced in FIG. 5A.

DETAILED DESCRIPTION OF ONE OR MORE EMBODIMENTS

Figure 1:
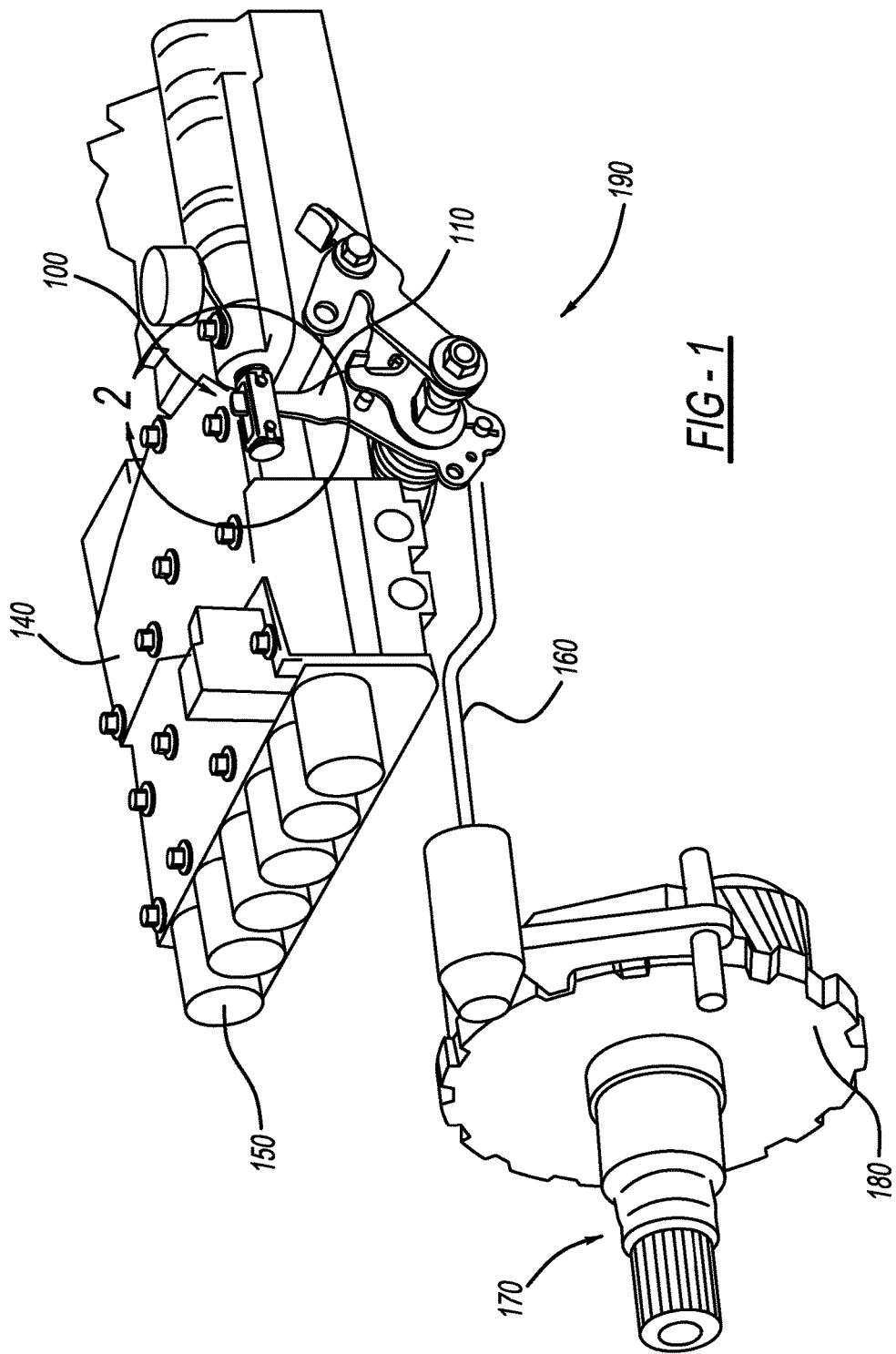
FIG. 1 illustratively depicts a valve assembly according to one or more embodiments as employed in a transmission control unit.

As referenced in the FIGS., the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

As detailed herein elsewhere, the present invention in one or more embodiments is believed to be advantageous in at least providing a pin bracket and a valve assembly employing the same via which a lever may be relatively better center-aligned to a valve for improved positional and operational controls. The pin bracket and the valve assembly may be used in any suitable lever control systems such as transmission control systems and any other suitable hydraulic and/or mechanical control systems.

As further detailed herein elsewhere, the pin bracket may be designed and positioned such that the lever contacts only the pin bracket and its associated pins at an assembly position and does not necessarily need to contact the valve shaft itself, accordingly the valve shaft may include or be formed of a material relatively less sturdy and hence more cost efficient, such as a material including aluminum.

In one or more embodiments, and further in view of FIG. 1, FIG. 2A, FIG. 2B and FIG. 3, a valve assembly generally shown at 100 includes a valve shaft 202, and a valve head 204 extending from the valve shaft 202, wherein the valve head 204 defines first and second through-apertures 314, 324 extending along a width direction W and a bore 234 extending along a height direction H, the first and second through-apertures 314, 324 being at least partially received within the bore 234. The valve shaft 202 may at least be partially received within a housing 230.

Figure 2:
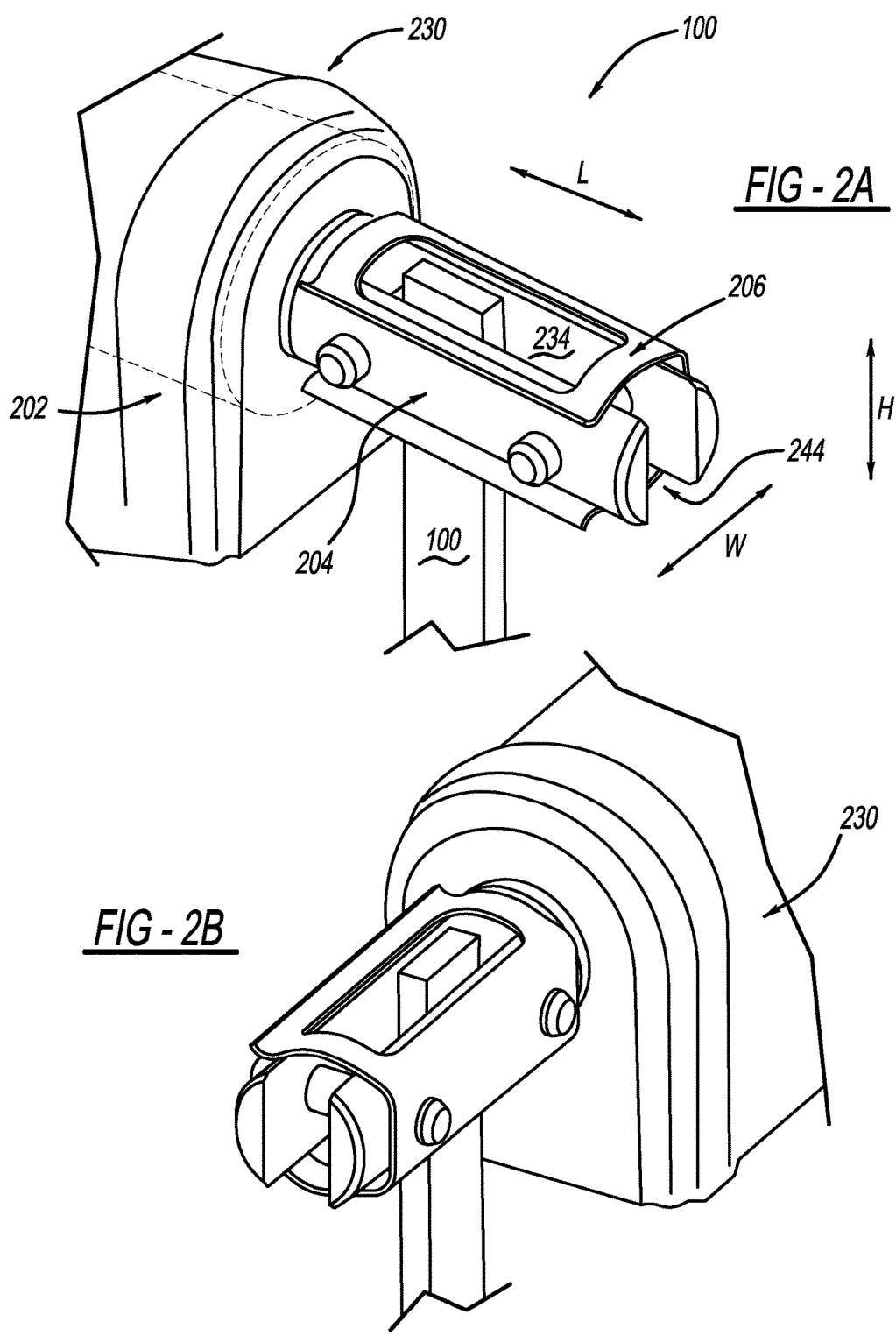
FIG. 2A illustratively depicts an enlarged perspective view of the valve assembly referenced in FIG. 1.
FIG. 2B illustratively depicts an alternative enlarged perspective view of the valve assembly referenced in FIG. 1.

The valve assembly 100 may further include a pin bracket 206 to be attached to the valve head 204, the pin bracket 206 including a bracket body 306 with first and second cover panels 316, 326 and a waist panel 336 positioned there-between, and first and second pins 346, 356 connected to the waist panel 336, wherein the first and second pins 346, 356 are to be received through the first and second through-apertures 314, 324 of the valve head 204 at an assembly position such as the position illustratively depicted in FIG. 2A and FIG. 2B.

As detailed herein, the valve assembly 100 is believed to impart improved operational control to a lever 110 to be received through the bore 234 of the valve head 204. The valve assembly 100 may be employed in any suitable operational environment, with FIG. 1 illustratively depicting a non-limiting example of such an environment. For instance, and referring back to FIG. 1, the valve assembly 100 may be in communication with a main control assembly 140 of a transmission unit 190 including a number of solenoids 150, where a positional change of the lever 110 as controlled by the valve assembly 100 may be translated to an operational change of an output shaft 170 which in turn is connected to a park gear 180 and a park rod 160.

Referring back to FIG. 2A and FIG. 2B, the bore 234 may be of an open-loop in cross-section such that the valve head 204 defines an opening 244 via which an object such as the lever 110 may move into or out of the bore 234 along a longitudinal direction L, when the pin bracket 206 is not engaged to the valve head 204. This configuration may be beneficial in that the lever 110 may be completely disengaged from the valve head 204 along the longitudinal direction L, without having to move along the height direction H.

Figure 3:
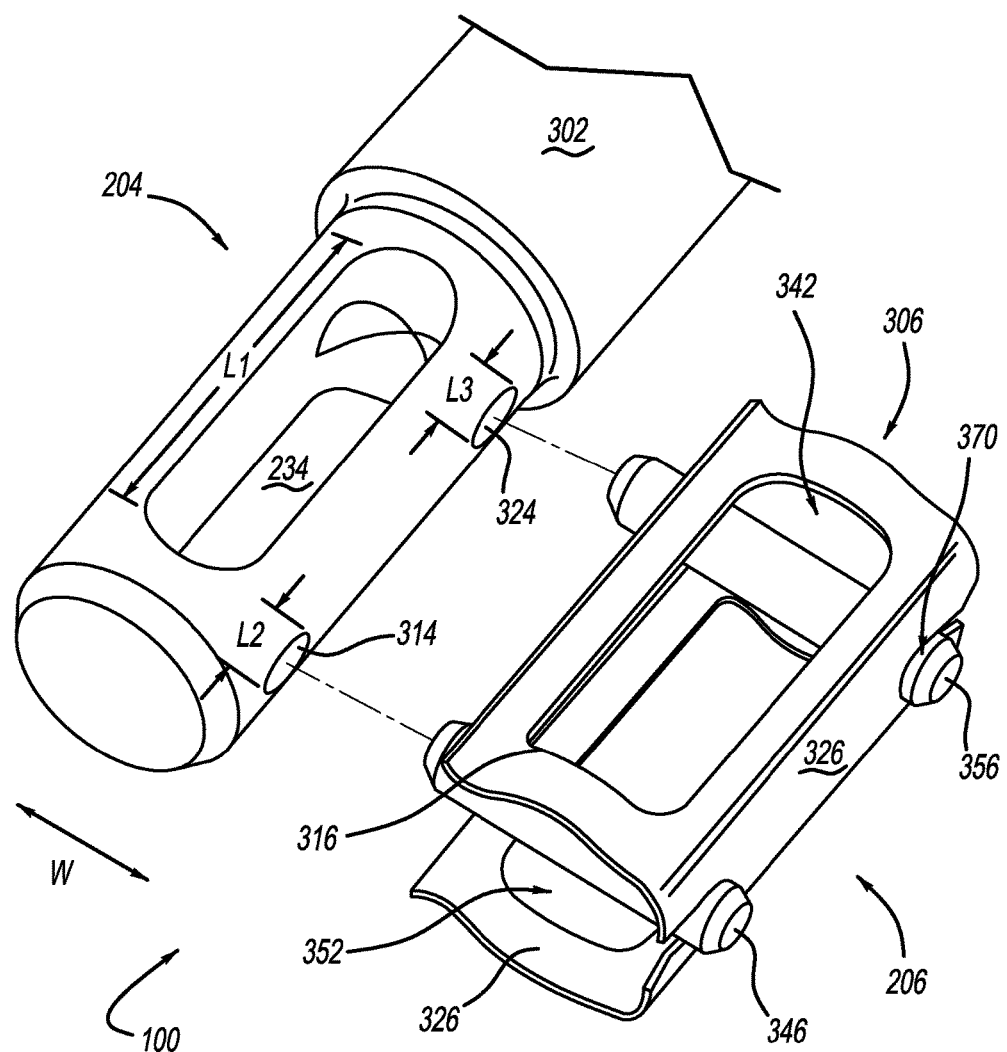
FIG. 3 illustrative depicts an alternative perspective view of the valve assembly referenced in FIG. 2A or FIG. 2B.

In an alternative, and further in view of FIG. 3, the bore 234 may be of a closed-loop in cross-section, without any side openings such as the opening 244 illustratively depicted in FIG. 2A or FIG. 2B. This configuration may be beneficial in that a lateral disengagement of the lever 110 along the longitudinal direction L away from the valve head 202 may be effectively discouraged and the lever 110 may move relative to the valve head 204 along the height direction H to effectuate a disengagement.

A longitudinal length L1 of the slot 234 may be greater than a cross-sectional width L2 or L3 of the first and second through-apertures 314, 324. Accordingly, this configuration helps ensure that the lever 110 be positioned within a space within the slot 234 that is defined between the first and second pins 346, 356 in an assembly position. The beauty and benefit associated with design is believed to be that, with this configuration, the lever 110 is to either contact an outer surface of the first pin 346 or the second pin 356, or remain spaced apart from the outer surface. Because the outer surface is a convex surface, the lever 110 is to contact the outer surface with a relatively minimum of surface contact and therefore undesirable surface retention imparted onto the lever 234 is believed to be kept at a reasonable minimum. This in turn helps centerline the lever 110 as it is received within the slot 234 and between the pins 346, 356.

Referring back to FIG. 3, at least one of the first and second pins 346, 356 may include a groove to engage the waist panel 336. For instance, the second pin 356 includes a groove 370 to engage the waist panel 336 such that the second pin 356 may be rotatable about the groove 370 relative to the waist panel 356 at a disengagement position such as the position illustratively depicted in FIG. 3.

The first pin 346 may similarly include a groove to engage the waist panel 336, like the groove 370 referenced in relation to the second pin 356. In certain embodiments, the first pin 346 may be made stationary relative to the waist panel 336, optionally via welding, such that movement of the first pin 346 relative to the waist panel 336 is not purposefully encouraged. The first pin 346 being configured as stationary and the second pin 356 being configured as movable relative to the waist panel 336 is believed to impart beneficial amount of flexibility and rigidity to the pin bracket 206 as a whole relative to the valve head 204 to achieve a desirable fit and engagement. Of course, a reverse arrangement may be desirable in certain instances where the first pin is made movable and the second pin is made stationary relative to the waist panel 336.

One of the first pin 346 and the second pin 356 may be configured as a floating pin such as a floating pin 556 referenced in FIG. 5B to be received via an elongated receiving aperture 570 for positional change along direction S as desirable. The other one of the first pin 346 and the second pin 356 may be configured as a fixed pin such as a fixed pin 546 referenced in FIG. 5C to be received via a receiving aperture 572 as a relatively stationary fixture. Both of the receiving apertures 570 and 572 may be similarly positioned on a waist 536 which is an alternative depiction of the waist 336 of FIG. 3 and the waist 436 of FIG. 4.

Referring back to FIG. 3 and further in view of FIG. 2A and FIG. 2B, the second cover panel 326 may include a second cover aperture 352 to align with the slot 234 of the valve head 204 so as to collectively receive there-through the lever 110. Similarly, and dependent upon the protruding length of the lever 110, the first cover panel 316 may include also a first cover aperture 342 to allow for a portion of the lever 110 to pass through. However, in the event the lever 110 is relatively short in its protruding portion, the first cover aperture 342 may not be necessarily.

The first and second cover panels 316, 326 function, in collaboration with the waist panel 336, to firmly maintain the first and second pins 346, 356 relative to the valve head 204. For this functionality, suitable alteration to the structure and configuration of the first and second cover panels 316, 326, and even to the waist panel 336, may be accommodated within the spirit of the present invention in one or more embodiments. For instance, and as illustratively depicted in FIG. 4, a pin bracket 406 as an alternative to the pin bracket 206 referenced in FIG. 3 includes a first cover panel collectively shown at 416, a second cover panel collectively shown at 426, and a wait panel 436 positioned there-between. Unlike the first and second cover panels 316, 326 referenced in FIG. 3, the first and second cover panels 416, 426 are discontinuous in their respective outer contour or outer perimeter. In the illustration shown in FIG. 4, the first and second cover panels 416, 426 may each be configured as including two spaced apart legs for the purposes of securing the pin bracket 406 onto the valve head 204, while allowing the lever 110 to be received through the slot 234.

In one or more embodiments, the present invention as set forth herein is believed to have overcome certain challenges associated with bracket shaft designs. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A valve assembly, comprising:
   a valve end defining first and second through-apertures and a vertically-extending slot of an open-loop in cross-section; and
   a pin bracket including a bracket body with first and second cover panels and a waist panel positioned there-between, and first and second pins connected to the waist panel, wherein the first and second pins are to be received through the first and second through-apertures of the valve end at an assembly position.

2. The valve assembly of claim 1, wherein a longitudinal length of the vertically-extending slot is greater than a cross-sectional width of at least one of the first and second through-apertures.

3. The valve assembly of claim 1, wherein the first and second cover panels respectively include first and second cover apertures to align with the slot of the valve end so as to collectively receive there-through a lever.

4. The valve assembly of claim 1, wherein at least one of the first and second pins includes a groove to engage the waist panel.

5. The valve assembly of claim 4, wherein the at least one of the first and second pins is rotatable about the groove relative to the waist panel.

6. A pin bracket and valve end assembly comprising:
- a valve end defining first and second through-apertures, wherein the valve end further defines a slot extending along a height direction, and wherein the first and second cover panels respectively include first and second cover apertures to align with the slot of the valve end so as to collectively receive there-through a lever; and
- a pin bracket comprising:
  - a bracket body including first and second cover panels and a waist panel positioned there-between; and
  - first and second pins connected to the waist panel, wherein the first and second pins are to be received through the first and second through-apertures of the valve end at an assembly position.

7. The pin bracket and valve end assembly of claim 6, wherein at least one of the first and second pins includes a groove to engage the waist panel.

8. The pin bracket and valve end assembly of claim 7, wherein the at least one of the first and second pins is rotatable about the groove relative to the waist panel.

9. A valve assembly, comprising:
- a valve shaft;
- a valve end extending from the valve shaft, wherein the valve end defines first and second through-apertures extending along a width direction and a slot extending along a height direction; and
- a pin bracket to be attached to the valve end, the pin bracket including a bracket body with first and second cover panels and a waist panel positioned there-between, and first and second pins connected to the waist panel, wherein the first and second pins are to be received through the first and second through-apertures of the valve end at an assembly position, wherein at least one of the first and second pins includes a groove to engage the waist panel.

10. The valve assembly of claim 9, wherein the slot is of an open-loop in cross-section.

11. The valve assembly of claim 9, wherein the slot is of a closed-loop in cross-section.

12. The valve assembly of claim 9, wherein the first and second cover panels respectively include first and second cover apertures to align with the slot of the valve end so as to collectively receive there-through a lever.

13. The valve assembly of claim 9, wherein a longitudinal length of the slot is greater than a cross-sectional width of at least one of the first and second through-apertures.

14. The valve assembly of claim 13, wherein the at least one of the first and second pins is rotatable about the groove relative to the waist panel.

* * * * *